(12) United States Patent
Fox et al.

(10) Patent No.: US 8,572,550 B2
(45) Date of Patent: Oct. 29, 2013

(54) METHOD AND SYSTEM FOR SCORING A SOFTWARE ARTIFACT FOR A USER

(71) Applicant: Sonatype, Inc., Silver Spring, MD (US)

(72) Inventors: Brian Edward Fox, Goffstown, NH (US); Joel Orlina, Silver Spring, MD (US)

(73) Assignee: Sonatype, Inc., Fulton, MD (US)

( * ) Notice: Subject to any disclaimer, the term of this patent is extended or adjusted under 35 U.S.C. 154(b) by 0 days.

(21) Appl. No.: 13/780,525

(22) Filed: Feb. 28, 2013

(65) Prior Publication Data
US 2013/0191808 A1 Jul. 25, 2013

Related U.S. Application Data

(63) Continuation of application No. 13/089,751, filed on Apr. 19, 2011, now Pat. No. 8,438,532.

(51) Int. Cl.
*G06F 9/44* (2006.01)
(52) U.S. Cl.
USPC .......................... 717/101; 717/100; 717/120
(58) Field of Classification Search
None
See application file for complete search history.

(56) References Cited

U.S. PATENT DOCUMENTS

| | | | |
|---|---|---|---|
| 7,080,355 B2 | 7/2006 | Carlson et al. | |
| 7,149,734 B2 | 12/2006 | Carlson et al. | |
| 7,322,024 B2 | 1/2008 | Carlson et al. | |
| 7,343,386 B2 | 3/2008 | Gomes et al. | |
| 7,506,312 B1 | 3/2009 | Girolami-Rose et al. | |
| 7,644,101 B2 | 1/2010 | Yano | |
| 7,707,162 B2 | 4/2010 | Naphade et al. | |
| 7,735,068 B2 | 6/2010 | Siddaramappa et al. | |
| 7,788,632 B2 | 8/2010 | Kuester et al. | |
| 7,814,078 B1 | 10/2010 | Forman et al. | |
| 7,844,592 B2 | 11/2010 | Shoval et al. | |
| 7,877,391 B2 | 1/2011 | Bird et al. | |
| 8,060,871 B2 * | 11/2011 | Bernabeu-Auban et al. | 717/174 |
| 8,069,182 B2 | 11/2011 | Pieper | |
| 8,156,092 B2 | 4/2012 | Hewett et al. | |
| 8,156,120 B2 | 4/2012 | Brady | |
| 8,280,755 B2 | 10/2012 | Stuhec et al. | |
| 8,296,251 B1 | 10/2012 | Athayde | |
| 8,356,278 B2 * | 1/2013 | Drissi et al. | 717/114 |

(Continued)

OTHER PUBLICATIONS

Gacek, "Exploiting Domain Architectures in Software Reuse", 1992, ACM 0-89791-739- 1/95/0004, pp. 229-232.*

(Continued)

*Primary Examiner* — Thuy Dao
*Assistant Examiner* — Stephen Berman
(74) *Attorney, Agent, or Firm* — Posz Law Group, PLC

(57) ABSTRACT

A software artifact is scored for a user. Metadata associated with an artifact about project activity of how active an artifact project is to which the artifact belongs, a security risk indicated in the metadata of the artifact, or a license indicated in the metadata of the artifact, is collected from a software repository. A weighting of the artifact alone is determined from the metadata associated with the artifact that indicates desirability of the project activity, the security risk, or the license. The metadata associated with the artifact is compared to appropriateness with a metadata of a user project to which the user belongs as indicated by a profile of the user, so as to provide a score considering the determined weighting of the artifact and a appropriateness of the artifact for the user with respect to an intended use of the artifact by the user.

15 Claims, 7 Drawing Sheets

(56) References Cited

U.S. PATENT DOCUMENTS

| | | | |
|---|---|---|---|
| 8,359,285 | B1 | 1/2013 | Dicker et al. |
| 8,438,532 | B2 | 5/2013 | Fox et al. |
| 8,464,205 | B2 | 6/2013 | Chaar et al. |
| 8,473,894 | B2 | 6/2013 | Fox et al. |
| 8,479,159 | B2 | 7/2013 | Klinger et al. |
| 8,499,284 | B2 | 7/2013 | Pich et al. |
| 2003/0046282 | A1 | 3/2003 | Carlson et al. |
| 2004/0010786 | A1 | 1/2004 | Cool et al. |
| 2004/0243968 | A1 | 12/2004 | Hecksel |
| 2005/0137884 | A1 | 6/2005 | Baird |
| 2006/0020937 | A1 | 1/2006 | Schaefer |
| 2006/0037000 | A1* | 2/2006 | Speeter et al. .......... 717/120 |
| 2006/0149717 | A1 | 7/2006 | Bird et al. |
| 2007/0033567 | A1* | 2/2007 | Carlson et al. .......... 717/100 |
| 2007/0050232 | A1 | 3/2007 | Chang et al. |
| 2007/0089086 | A1 | 4/2007 | Ortloff |
| 2007/0143735 | A1* | 6/2007 | Clemm et al. .......... 717/100 |
| 2007/0250829 | A1 | 10/2007 | Hillier et al. |
| 2007/0277148 | A1 | 11/2007 | Venolia |
| 2008/0028378 | A1* | 1/2008 | Biswas et al. .......... 717/151 |
| 2008/0127040 | A1 | 5/2008 | Barcellona |
| 2008/0154965 | A1 | 6/2008 | Pedersen |
| 2008/0229300 | A1 | 9/2008 | O'Brien |
| 2008/0270374 | A1 | 10/2008 | Li et al. |
| 2008/0313595 | A1 | 12/2008 | Boulineau et al. |
| 2009/0013310 | A1 | 1/2009 | Arner et al. |
| 2009/0055809 | A1 | 2/2009 | Campbell |
| 2009/0094572 | A1 | 4/2009 | Hegde et al. |
| 2009/0119261 | A1 | 5/2009 | Ismalon |
| 2009/0138843 | A1* | 5/2009 | Hinton et al. .......... 717/101 |
| 2009/0144698 | A1 | 6/2009 | Fanning et al. |
| 2009/0307662 | A1 | 12/2009 | Ackerman |
| 2010/0023920 | A1 | 1/2010 | Chaar et al. |
| 2010/0058295 | A1 | 3/2010 | Johnson et al. |
| 2010/0100543 | A1 | 4/2010 | Brady |
| 2010/0153920 | A1 | 6/2010 | Bonnet |
| 2010/0211924 | A1* | 8/2010 | Begel et al. .......... 717/101 |
| 2010/0306730 | A9* | 12/2010 | Carlson et al. .......... 717/101 |
| 2010/0333067 | A1 | 12/2010 | Goh et al. |
| 2011/0023016 | A1* | 1/2011 | Khader et al. .......... 717/120 |
| 2011/0055186 | A1 | 3/2011 | Gopalakrishnan |
| 2011/0066619 | A1 | 3/2011 | Perantatos et al. |
| 2011/0145810 | A1 | 6/2011 | Forsyth |
| 2011/0258162 | A1 | 10/2011 | Lam |
| 2011/0307862 | A1 | 12/2011 | Abrams et al. |
| 2012/0060148 | A1 | 3/2012 | Jones et al. |
| 2012/0110039 | A1 | 5/2012 | McKay et al. |
| 2012/0124547 | A1 | 5/2012 | Halbedel |
| 2012/0159420 | A1* | 6/2012 | Yassin et al. .......... 717/101 |
| 2012/0246616 | A1 | 9/2012 | Frontiero et al. |
| 2012/0272205 | A1 | 10/2012 | Fox et al. |
| 2012/0311534 | A1 | 12/2012 | Fox et al. |
| 2012/0331439 | A1 | 12/2012 | Zimmermann et al. |
| 2013/0007704 | A1* | 1/2013 | Haynes et al. .......... 717/120 |
| 2013/0047137 | A1 | 2/2013 | Bak et al. |
| 2013/0067426 | A1 | 3/2013 | Fox et al. |
| 2013/0067427 | A1 | 3/2013 | Fox et al. |
| 2013/0074038 | A1 | 3/2013 | Fox et al. |
| 2013/0212562 | A1 | 8/2013 | Fox et al. |
| 2013/0227517 | A1 | 8/2013 | Fox et al. |

OTHER PUBLICATIONS

Prieto-Diaz et al., "Classifying Software for Reusability", Jan. 1987, IEEE Software, pp. 6-16.*

Meling et al., "Storing and Retrieving Software Components: A Component Description Manager", 2000, IEEE, pp. 1-11.*

U.S. Appl. No. 13/861,065, filed Apr. 11, 2013, Fox et al.

Office Action issued by the U.S. Patent Office on Apr. 8, 2013 in connection with related U.S. Appl. No. 13/151,816.

Ji et al., "Efficient Interactive Fuzzy Keyword Search", WWW 2009, Apr. 20-24, 2009, ACM 978-1-60558-487-4/09/04, pp. 371-380.

Happel et al., "Potentials and Challenges of Recommendation Systems for Software Development", RSSE '08, Copyright 2008 ACM 978-1-60558-228-3, pp. 11-15.

Maalej et al., "A Lightweight Approach for Knowledge Sharing in Distributed Software Teams", T. Yamaguchi (Ed.): PAKM 2008, LNAI 5345, pp. 14-25.

Office Action issued by the U.S. Patent Office on Apr. 9, 2013 in connection with related U.S. Appl. No. 13/231,162.

Gardler, "Reuse Readiness Rating", 2009, pp. 1-17, downloaded from the Internet on Apr. 1, 2013 from <url>:http://www.oss-watch.ac.uk/resources/reuseReadinessRating.

Open Source Initiative, "Home", May 5, 2010, pp. 1-2, downloaded from the Waybackmachine Internet Archive on Apr. 1, 2013.

U.S. Appl. No. 13/369,617, filed Feb. 9, 2012, Fox et al.

U.S. Appl. No. 13/476,160, filed May 21, 2012, Fedorenko et al.

U.S. Appl. No. 13/544,335, filed Jul. 20, 2012, Jackson et al.

U.S. Appl. No. 13/744,542, filed Jan. 18, 2013, Fox et al.

Sourceforge, List of Current OSS Discovery Fingerprints [online] [retrieved on May 27, 2012] Retrieved from the internet: <http://ossdiscovery.sourceforge.net/fingerprints.html>.

Sourceforge, OSS Discovery FAQ [online] [retrieved on May 27, 2012] Retrieved from the internet: <http://ossdiscovery.sourceforge.net/faq.html>.

Cubranic et al., "Hipikat: Recommending Pertinent Software Development Artifacts," 2003, Proceedings of the 25th International Conference on Software Engineering (ICSE '03), pp. 1-11.

Cubranic et al., "Hipikat: A Project Memory for Software Development," IEEE Transactions on Software Engineering, vol. 31, No. 6, Jun. 2005, pp. 446-465.

Milanovic et al., "Model & Metamodel, Metadata and Document Repository for Software and Data Integration", 2008, MoDELS 2008, LNCS 5301, pp. 416-430, 2008.

Sherman, "A Process-Oriented Ontology for Representing Software Engineering Project Knowledge", 2009, A doctoral dissertation submitted in partial fulfillment of the requirements for the degree of Doctor of Philosophy, Graduate School of Computer and Information Sciences, Nova Southeastern University, pp. 1-244.

Notice of Allowance issued by the U.S. Patent Office on Jan. 22, 2013 in connection with related U.S. Appl. No. 13/089,751.

Notice of Allowance issued by the U.S. Patent Office on Mar. 15, 2013 in connection with related U.S. Appl. No. 13/483,412.

Robillard et al., "Recommendation Systems for Software Engineering", IEEE Computer Society, 2010, pp. 80-86.

Duan et al., "Clustering Support for Automated Tracing", ASE '07, Nov. 5-9, 2007, pp. 244-253.

U.S. Appl. No. 13/962,122, filed Aug. 8, 2013, Fox et al.

David, "Recommending Software Artifacts from Repository Transactions", IEA/AIE '08 Proceedings of the 21st International conference on Industrial, Engineering and Other Applications of Applied Intelligent Systems: New Frontiers in Applied Artificial Intelligence. 2008. pp. 189-198.

Herbsleb, "Global Software Engineering: The Future of Socio-technical Coordination," 2007, FOSE '07 2007 Future of Software Engineering, pp. 188-198.

Kagdi et al., "A survey and taxonomy of approaches for mining software repositories in the context of software evolution," 2007, Journal of Software Maintenance and Evolution: Reseach and Practice. J. Soft. Maint. Evol.: Res. Pract. 2007; 19:77-131.

Office Action issued by the U.S. Patent Office on Jun. 18, 2013 in related U.S. Appl. No. 13/369,617.

Notice of Allowance issued by the U.S. Patent Office on Aug. 14, 2013 in related U.S. Appl. No. 13/151,816.

Notice of Allowance issued by the U.S. Patent Office on Sep. 9, 2013 in related U.S. Appl. No. 13/231,162.

* cited by examiner

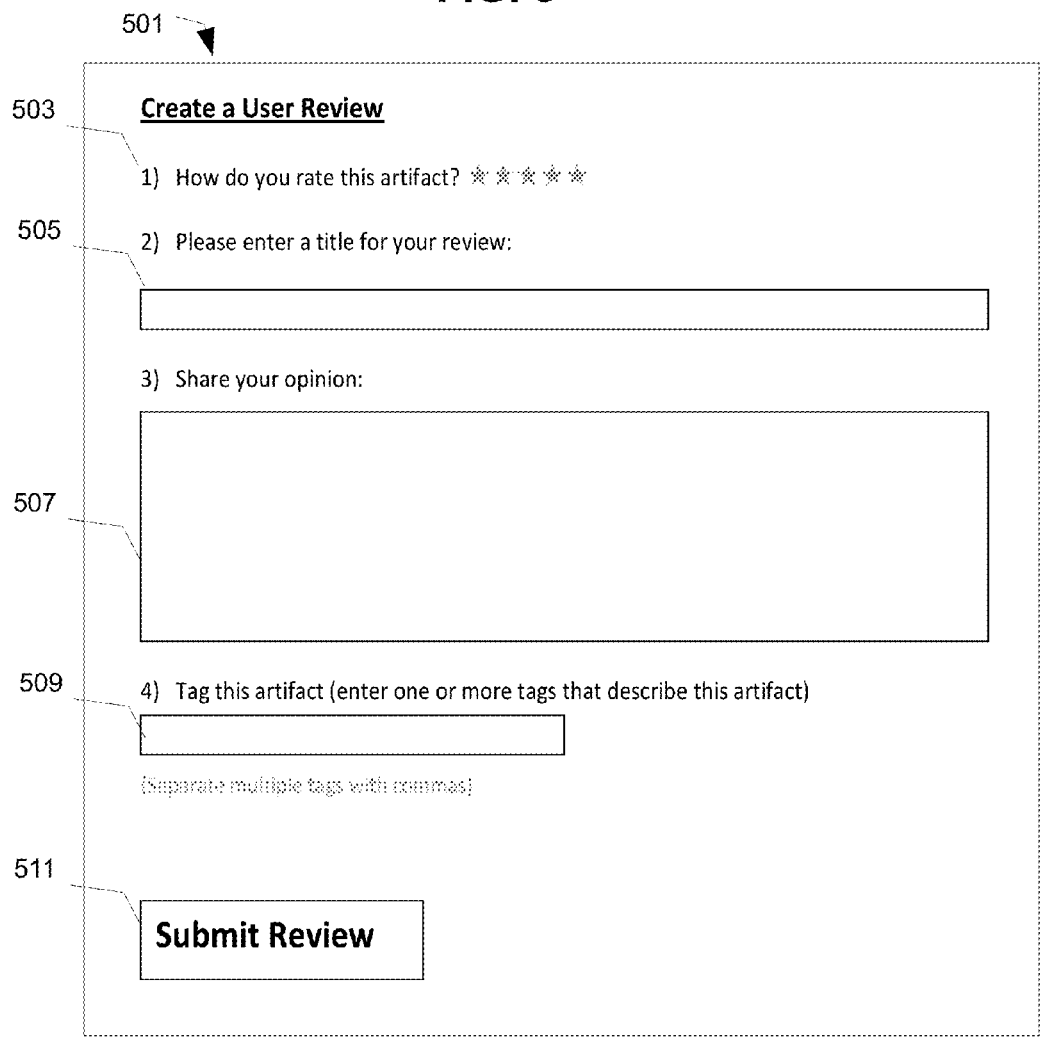

METHOD AND SYSTEM FOR SCORING A SOFTWARE ARTIFACT FOR A USER

CROSS-REFERENCE TO RELATED APPLICATION

This application is a continuation of U.S. patent application Ser. No. 13/089,751 filed 19 Apr. 2011, titled "METHOD AND SYSTEM FOR SCORING A SOFTWARE ARTIFACT FOR A USER," which is herein incorporated by reference in its entirety.

TECHNICAL FIELD

The technical field relates in general to software development, and more specifically to providing information about software artifacts used in software development.

BACKGROUND

All software developers, in whatever language and platform, whatever methodology, will realize that there is some software that they don't want to write and that already exists. However, there may be multiple artifacts that already exist and possibly do what the programmer needs to do. Developers that write their own software conventionally will use published artifacts as building blocks in writing code within a larger project, so as to avoid re-writing software which already exists.

Complicating the problem of locating an appropriate existing artifact is that a software artifact which is appropriate for one project, may not be particularly appropriate for the same use in another project.

SUMMARY

Accordingly, one or more embodiments provide a computer system. The computer system includes a transceiver operable to transmit and receive communications over at least a portion of a network; and a processor cooperatively operable with the transceiver. The processor is configured to facilitate collecting, from a software repository by communication over the transceiver, metadata associated with a software artifact about project activity of how active an artifact project is to which the software artifact belongs, a security risk indicated in the metadata of the artifact, or a license indicated in the metadata of the artifact. The processor also determines a weighting of the software artifact alone from the metadata associated with the software artifact that indicates desirability of the project activity, the security risk, or the license. Also, the processor compares the metadata associated with the software artifact to appropriateness with a metadata of a user project to which the user belongs as indicated by a profile of the user, so as to provide a score considering the determined weighting of the software artifact and a appropriateness of the artifact for the user with respect to an intended use of the artifact by the user.

In a further embodiment, the metadata assigned to the artifact and which is used in determining the weighting of the artifact includes:
 group identifier uniquely identifying a publisher of the artifact,
 artifact identifier uniquely identifying the artifact within the publisher, and
 version number uniquely indicating a temporal version of the artifact,
the software project to which the software artifact belongs being determined from the group identifier, artifact identifier, and version number, and how active the software project is being determined from a log of the project at the software repository of the project of the artifact.

In another embodiment, the metadata assigned to the artifact and which is used in determining the weighting of the artifact includes Group Id, Artifact ID, and version number from a POM assigned to the artifact in the repository, In yet another embodiment, the project is determined from the group identifier, artifact identifier, and version number; and how active the project is being determined from a log of the project at the software repository of the project of the artifact.

In a still further embodiment, the metadata of the user project to which the user belongs used in determining the appropriateness of the artifact includes:
 an indication of functionality the artifact is addressed to,
 an indication of the sponsoring organization of the user project, and
 an indication of the license of the user project.

Another embodiment further includes weighting the software artifact by user-provided ranking specific to the artifact of a community of users to which the user belongs as determined by the profile of the user or the user project to which the user belongs as indicated by the profile of the user.

In yet another embodiment, the artifact is in stored in the software repository according to the Open Source Definition, the software repository being an open source repository.

Still another embodiment further includes interacting with user to collect human-provided meta data including community ranking specific to the artifact, storing the human-provided meta data in relation to the software artifact, and using the human-provided meta data to further adjust the score of the software artifact.

A further embodiment is a computer-implemented method for scoring a software artifact for a user, according to one or more of the above embodiments.

Still another embodiment is a non-transitory computer-readable medium comprising instructions for execution by a computer, the instructions including a computer-implemented method for providing a method for scoring a software artifact for a user, the instructions for implementing the method.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 5 is a diagram illustrating a user interface to collect human-provided meta-data for an artifact.

DETAILED DESCRIPTION

Figure 1:
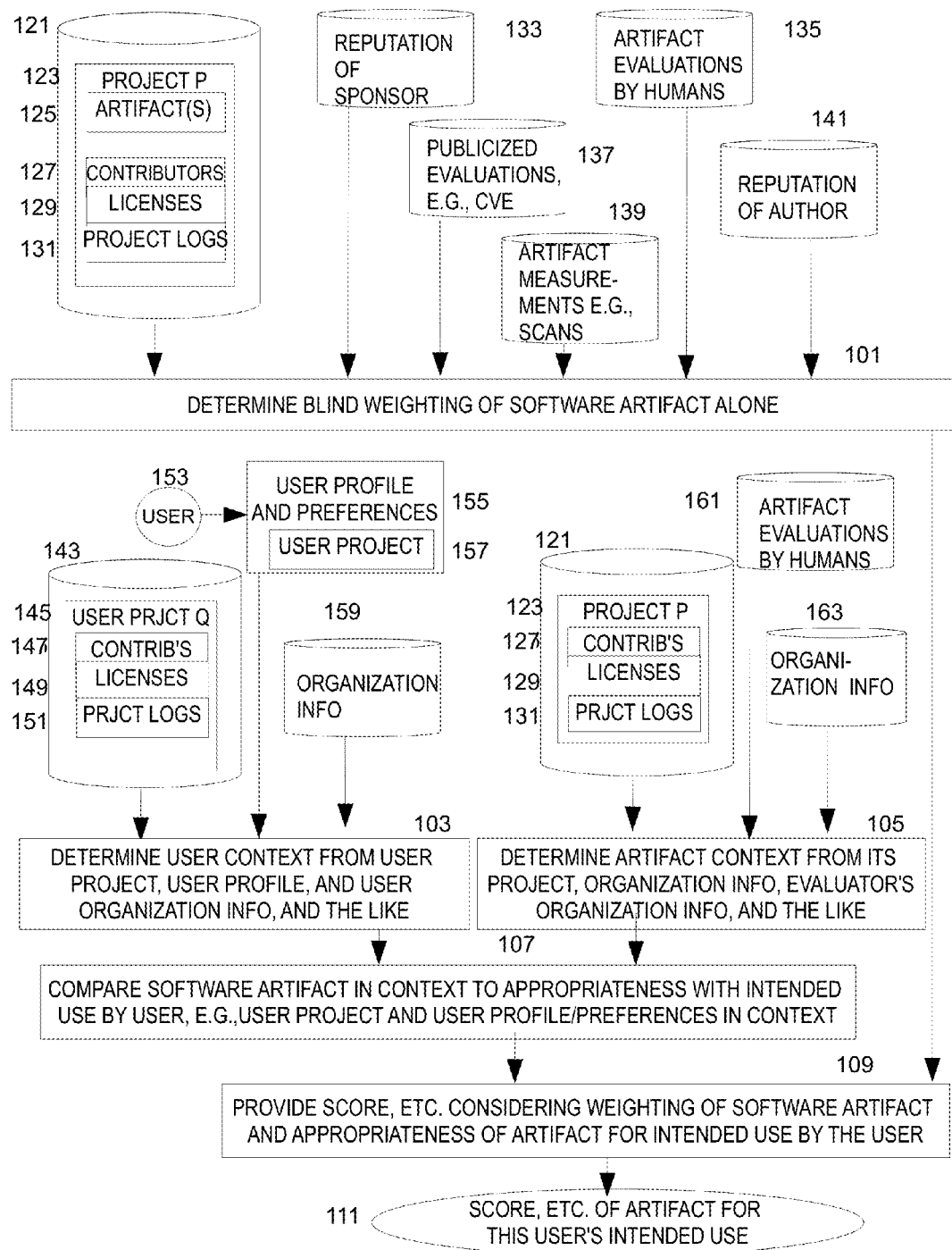
FIG. 1 is a data flow diagram illustrating scoring a software artifact for the intended use by a user.

In overview, the present disclosure concerns software development, in which software code building blocks, sometimes referred to as binary or source code, have been published after a formal process of vetting and then being released for use as one of plural building blocks to be used in a complete piece of software. Such software development can utilize build management tools, for example that assist in controlling the software artifacts that are selected and/or are used in a project. More particularly, various inventive concepts and principles are embodied in systems, devices, and methods therein for providing information about the appropriateness of a software artifact for its intended use in a particular software development project.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

DEFINITIONS

The claims use the following terms which are defined to have the following meanings for the purpose of the claims herein.

The term "artifact" or "software artifact" or "software build artifact" used herein is defined to be a specific version of an existing reusable software code building block, which is binary or source code, that has been published, for example as referred to in the open source model, to a publicly available repository, such that it was vetted, approved, indexed so it can be located, and formally released to the public, but is not a complete stand-alone finished product. The term "artifact", "software artifact" or "software build artifact" is not used herein in the broad sense. A concrete example of an artifact is something like, e.g., Hibernate_3, which is an object-relational mapper which allows the JAVA developer to interact with relational database as if using native object oriented code. Its Group ID is org.hibernate, its artifact ID is artifact-core, its version is 3.0. Less formally, the artifact can be understood to be a bit of code which a developer does not wish to write himself/herself and so the developer uses an artifact which is published in a repository. In the MAVEN world, for example, there is a known pre-defined process for publishing an artifact to the MAVEN central web-site or other publicly available repository.

The term "computer system" or "computer" used herein denotes a device sometimes referred to as a computer, laptop, personal computer, personal digital assistant, notebook computer, personal assignment pad, server, client, mainframe computer, variations and equivalents thereof.

The term "metadata" is defined to be data that describes the content and context of a file with which it is associated. Metadata that is associated with a software artifact can indicate a project to which the artifact belongs, a security of the artifact or a license that is associated with the artifact, among other things.

"Open source" software is defined herein to be source code that allows distribution as source code as well as compiled form, with a well-publicized and indexed means of obtaining the source, optionally with a license that allows modifications and derived works.

The term "Open Source Definition" is used herein to mean the Open Source Definition available from the Open Source Initiative, variations and evolutions thereof.

The term "project" is used herein to indicate a pre-defined collection of related software artifacts which a group of users maintains; a project can be uniquely identified by a group ID, optionally with artifact ID, optionally with version number. A project has a unique project name, a URL specific to the project, and a sponsoring organization; a project tracks its activity including logging when an artifact in the project is used or updated and the unique identity of the user that used or updated the artifact. Examples of projects include the Mozilla Foundation (sponsoring organization) which maintains the Firefox (project name) web browser, the Eclipse Foundation which maintains the M2Eclipse software, the Apache Software Foundation which maintains Maven, as well as private companies such as Sonatype that maintain their projects such as Sonatype Professional. A project can be a parent or child of another project, in which case the child can inherit group ID, version number, developers and contributors, plugin lists, report lists, plugin executions, and plugin configuration from the parent.

The term "repository" or "software repository" used herein are defined to mean an electronic storage system that stores software build artifacts and dependencies for later retrieval, to which artifacts are published in accordance with procedures which are well known to those in the field, so that artifacts made by one software developer are published to be available for further use by other software developers, to be incorporated as building blocks to build software products which can be executed; a repository can include a computer server by which the stored electronic copies of artifacts are made available for use by software developers to be incorporated as building blocks to build software products which can be executed; the repository has a unique identifier that indicates the software developer (an individual or a group) that contributed the artifact. A repository can be remote or local.

The term "software build" used herein specifically is defined to mean a process as pre-defined in an executable build program of converting a plurality of artifacts obtained from a repository and combining the results into an executable stand-alone computer program or a software artifact for use in a further software build, including at least compiling artifacts and linking compiled artifacts and possibly binary artifacts from the repository, in a pre-determined order as defined in the build program.

The term "user" is defined herein specifically to be a software developer, a line coder, a technical architect, a development lead, or a development manager who is running a team of one or more developers, any of which are working on a software deliverable; or a C-level individual (CIO, CSO, and the like); or an individual that sets or enforces governing standards for software deliverables such as for vulnerability or licensing or artifacts. The term "user" is not used herein in the broad, common sense. The user can be management level because management can have final veto power over the software components in the software deliverable resulting from a project. Typically, but not always, an individual developer will not have the final say over which artifacts are approved.

<End of Definitions>

The inventors faced the problem of making sense of the giant jumble that is open source software, and finding a best artifact for their purposes among the giant jumble of available artifacts. However, the system described herein is applicable to any field of software development where the information is available from which a source or categorization of the artifact can be derived.

Concerns of software developers in selecting artifacts can include the following questions, for example. Functionality—does an available artifact do more than the artifact I have now? Does the artifact do exactly what I need it to do? Security—will the artifact perform without being hacked? Applicability—will the artifact perform for my intended audience? Is this an artifact that is in use by my peers, i.e., other people in my industry (which suggests a higher degree of trust and applicability for the intended goal).

A concrete example is open source artifacts that are primarily but not necessarily written in Java. There are hundreds of thousands of artifacts from which a developer can choose, but conventionally there is no set of guideposts to drive a user down a path of proper discovery, beyond traditional searching such as Google searches. Current techniques provide no scoring of artifacts, no ranking, and no set of key terms which are descriptive of one set of artifacts over another.

Conventionally, the process of building an executable computer program from software artifacts can be managed by a build tool, which is a computer program that coordinates and controls other programs to compile and link the various files which together comprise the executable computer program, in the correct order. A build tool can include preprocessing, compilation, linking, packaging, testing, and ultimate distribution of the executable computer program. A project management tool can provide a superset of features found in a build tool, and can facilitate communication among members of a working team. Examples of build tools and project management tools are Maven available at Apache Software Foundation ("Apache"), Apache Ant available from Apache, Buildr available from Apache, Gradle available from Gradle Inc., Apache Ivy, and the like, variations and evolutions thereof. It is assumed that one of skill in this field is generally familiar with "Maven: The Complete Reference" (2010) published by Sonatype, Inc. Mountain View, Calif. which further describes some basic concepts.

As further discussed herein below, various inventive principles and combinations thereof are advantageously employed to help developers that are writing their own software find information about appropriate artifacts for that particular developer.

Further in accordance with exemplary embodiments, there is provided a method and system for scoring a software artifact based on quality, industry, community standards compliance, and/or user-defined criteria. There is mechanism for machine-driven ingestion of metadata or information used to derive scores which is not human provided; and a User Interface for collecting information which is human provided. For example, metadata that is associated with the artifact about the activity of a project to which the artifact belongs can be collected, along with security associated with the artifact, or licensing associated with the artifact. The weighting of the artifact can be determined based on the collected metadata. Then, the weighted artifact (which has been weighted without regard to intended use by the user) can be compared to appropriateness with an intended use of the artifact by the user, so as to provide the score of the artifact specific to the user. A user in a different project with a different intended use can have a different score for the same artifact. In summary, a system and method to score a software artifact can be based on: quality of the artifact, industry in which it is used, and/or compliance with community or user-defined criteria for example.

Referring now to FIG. 1, a data flow diagram illustrating scoring a software artifact for the intended use by a user will be discussed and described. In overview, FIG. 1 illustrates that data flows into a process to determine 101 a blind weighting of a software artifact; data flows into a process to determine 103 user context from a user project, user profile, and user organization information, and the like; data flows into a process to determine 105 artifact context from the artifact's project, organization information, evaluator's organization information, and the like. Also, data flows from determination of user context 103 and determination of artifact context 105 to compare 107 the software artifact in context to appropriateness with its intended use by a user, e.g., a user project and user profile/preferences in context. Data flows from the blind weightings 101 and the comparison to appropriateness for the intended use by the user 107 to provide 109 a score or the like considering not only the blind (i.e., unadjusted) weighting of the software artifact but also the appropriateness of the artifact for the intended use by the user, to generate 111 a score or the like of the artifact for the user's intended use.

Because the generated score or the like strongly considers the user's subjective intended use as input by the user as well as the objective intended use determined by automated selection of information specifically relevant to the user's project and/or the artifact, an artifact with a higher score reliably will be more appropriate for incorporation into the user's project than artifacts with a lower score. Without this data flow and the appropriateness determination, a blind weighted software artifact which is ranked highly but which is inappropriate for the user's project could unfortunately be selected and the most appropriate software artifact which is ranked low could be overlooked.

Also illustrated in FIG. 1 are a repository 121 with Project P 123 (represented twice in the data flow diagram), a reputation of sponsor database 133, one or more artifact evaluations by humans databases 135, 161, a publicized evaluations database 137, an artifact measurements database 139, and a reputation of author database 141. The project 123 includes one or more artifacts 125, a list of the contributors 127 of the artifacts, the associated license(s) 129 to which the artifacts in the project are subject, and project logs 131. The project logs 131 can be, for example, source code controls (e.g., log in, check-in, check-out, update, etc.) and/or project issue tracking logs, as is known in the industry.

Also illustrated in FIG. 1 are a user 153, a user profile 155 with optional preferences for the user, and one or more organization information databases 159, 163. The user profile 155 can include an indication of the user project 157, in this example, user project Q 145. In FIG. 1 is illustrated another repository 143 with the user project Q 145, contributors 147 to the project, licenses 149 associated with the project, and project logs 151.

The premise is that, a software developer, such as user 153, wants to be able to use software modules/components (artifacts) that someone else has made publicly available, such as in one or more repositories 121 of one or more projects 123. If the artifacts are open source, they should be free of charge. The developer wants to determine which of the artifacts of a particular type they want to use based on information about the quality of that artifact as well as other information such as who else might be using that artifact in their same industry or similar types of industry.

As an example of "similar type of industry," consider a user who is a software developer in banking and wants to know if someone else in banking or finance uses the same module. As another example, a developer of a Fortune 1000 company wants to know whether other Fortune 1000 companies use the same module. As another example of a similar type of industry, consider that the developer in a regulated industry such as pharmaceuticals will be interested whether other developers in an industry under the same type of regulations are using the artifact. An artifact previously used by software developers of a similar industry or type of company will give the user more confidence than if the same artifact is used by an unknown start-up company or a different type of company or in a different industry.

Quality of an artifact also can be a concern. There are a variety of ways to measure quality, for example, based on other users' feedback and/or reported bugs.

Another consideration in selecting a software artifact can be compliance with community or other user-defined criteria. For example, a developer may indicate that they only want to use artifacts that are widely used in their same geography (e.g., Europe or Germany), or to only use artifacts that get a certain quality score level from user reviews, e.g., 3 or 4 star or better.

Furthermore, a user may want to have some other set of metrics they can use to determine the score of an artifact so the user can decide whether or not they want to use that artifact.

As discussed below, such a method and system can include one or both of two parts: (1) collecting/evaluating the above and/or related points, such as who is using the artifact, quality, etc., and (2) a user interface to select what the user wants.

In overview, metadata that the present system and method uses, of which a simplified representation is provided for example in FIG. 1, conveniently can be divided into three categories: (1) derived data, (2) community/contributed data, and (3) third party data. These are further discussed below.

Derived data is data which is collected about activity of the artifacts. Derived data can be, for example, conventional logs of which artifacts are downloaded from the project to users. These logs 131 in the projects 123 can be analyzed to determine, for example, how frequently the artifact is downloaded, to what geographic regions the artifact is downloaded (using a known technique), to what company is the artifact downloaded (by performing a known reverse DNS lookups to figure out the actual companies who are doing the downloading and from that determine their industry and size from an automatically or manually produced list or organization information 159, 163). As a concrete example, project activity may be directly derived or inferred from the source code control mechanism (SCM) associated with the project as well as the issue tracking systems that may be associated with the project. Also, projects conventionally collect information on how frequently an artifact is updated (reflected in the project logs 131), who the committers are who contributed the artifact (listed in the contributors 127), and what else the committers have contributed (obtained by reviewing contributors 127 lists in other projects). As is known, typically, a committer has digitally signed the contributed artifact so that the contributors 127, 147 information is highly reliable.

Community/contributed data can include, for example, reviews, scores, ranking, categorization, tagging. All of these are information that can be provided by users, for example, as artifact evaluations by humans 135, 161 about that artifact. This can be parallel to a review process provided in Amazon.com, Netflix and other web sites, and can be expanded to, e.g., "users who use artifact X tend to use artifact Y."

Third party data can be information pulled in from other sources and can be approximately matched to artifacts or information in the project about the artifacts. For example, data on artifact licenses can be obtained from a company that provides that type of information based on the licenses 129, 149 associated with the artifacts, data on security of the artifact can be obtained from NIST logs or vulnerability information, and quality information can be obtained from the project logs themselves. Here, the third party data is represented by the publicized evaluations, e.g., CVE 127 (common vulnerabilities and exposures information conventionally available from Mitre Corporation).

Typically there is not a one-to-one correspondence between the third party data and a particular artifact. Since the convention of project group/artifact/version is used for the convenience of programmers and is generally not known to persons that ultimately use the final software product, the third party data does not refer to the project group/artifact/version. Therefore, the identity of the artifact(s) to which the third party data actually is relevant must be resolved (manually or by developing and referring to a list) against the identity of the software indicated in the third party data. For example, if the artifact comes from project FOO, the artifact name and number must be reconciled against the logs for that artifact name and number at project FOO.

For example, the process to determine 101 a blind weighting of a software artifact can obtain derived data about the artifact 125 from the names of contributors 127 of the artifact, license of the project, and project logs 131 which indicate how often and how recently the artifact is updated. The process 101 can input community/contributed data, such as the artifact evaluations by humans 135 indicating the subject evaluation of the humans. The process 101 can input third party data such as publicized evaluations, e.g., a CVE and can resolve the third party data software name and release (e.g., Microsoft 2007 1.0) to the project group/artifact/version. Optionally, the reputations of the contributor organization and author 133, 141 (such as determined by user reviews) can be further input into the process 101. This information can be collectively evaluated to provide a blind weighting, that is, a weighting that is "blind" because it is made without considering the user or the intended use. Various techniques are known for collecting rankings and evaluations, weighting the information, increasing/decreasing weightings and the like, and any desired technique can be used herein.

The process to determine 103 the user context can use the user profile 155 from the user 153, the user project 143, and user organization information 159, and the like. The user profile 155 can be input from the user to determine their preferences for candidate artifacts, such as how recently used an artifact should be, minimum or maximum frequency of downloading and/or updating of an artifact, preferred contributors of an artifact, preferred sponsors of an artifact, standards for reputation of sponsor or author, minimum or maximum versions of an artifact, preferred licenses for an artifact, unacceptable licenses for an artifact, source code language, geographic requirements, and the like. The user profile can indicate the user project 157, which points to a particular user project 145, from which are obtained the contributors 147 and licenses 149; a candidate artifact of the user's project. The organization of the user can be obtained as explained above from the user's e-mail address, IP address, and/or from the sponsor as reflected in the user project 145. The information about the user's organization can be obtained from the organization information 159, such as geographic location, organization size, organization industry, organization regulations, public/private organization, and the like.

The process to determine 105 the artifact context can use information from the artifact's project 123, the artifact's contributors 127, the licenses 129 of the project 123, the project logs 131 of the artifact's project 123, the artifact's project's organization information 163, artifact contributor's organization information 163, artifact's evaluator's author reputation 141 for the artifact evaluation 161, and the like. The organization of the artifact can be obtained as explained above from the contributor's e-mail address, IP address, and/or from the sponsor as reflected in the artifact project 123. The information about the artifact sponsor's and/or contributor's organization can be obtained from the organization information 163, such as geographic location, organization size, organization industry, organization regulations, public/private organization, and the like.

The information from determination of user context 103 and determination of artifact context 105 can be used to compare 107 the software artifact in context to appropriateness with its intended use by a user. For example, an artifact 125 which has the same or overlapping context (e.g., for the artifact's project 123, a same or overlapping organization, geographic location, organization size, organization industry, organization regulations, public/private organization, and the like) as the user's project and/or preferences can be weighted more highly. As another example, an artifact evaluation 161 by a contributor which has the same context (e.g., for the human evaluator, a same or overlapping organization, geographic location, organization size, organization industry, organization regulations, public/private organization, and the like) as the user's project and/or preferences can be weighted more highly. Also, an artifact 125 which meets the user's preferences from the user's profile 155 such as frequency of use/update, how recently used/updated, minimum or maximum frequency of downloading and/or updating of an artifact (all as determined from the artifact's project's project log 131), contributors of an artifact 127, preferred sponsors of an artifact (as determined from the project 123 information), standards for reputation of sponsor or author (as determined from the sponsor/author by reference to the reputation of sponsor/author 133, 141), minimum or maximum versions of an artifact (as determined from the project version ID), preferred or unacceptable licenses for an artifact (as determined from the project's license 129), source code language (as determined from the project 123 information), geographic requirements (as determined from the project's sponsor/contributor with reference to the organization information 163), and the like, can be weighted more highly as being more appropriate. An artifact which does not meet requirements or minimum standards of the user, e.g., as determined by the user's profile, can be ranked as unacceptable and/or eliminated from further consideration.

The outcome of the blind weightings 101 and the comparison to appropriateness for the intended use by the user 107 can be combined to provide 109 the ultimate score or the like of the artifact for the user's intended use. Thus, a software article which has high evaluations by humans, highly reputable author and sponsor, and high reliability as determined by NIST, which has a very high blind rating, may be determined to be least appropriate because of disparity in for example size, geography, and industry of the artifact's organization and user's organization, a very low review by a human in the same industry as the user, and limited overlap of license terms.

Optionally, the user can be provided with the information which resulted in the score of the artifact for the user's further evaluation of the software.

Optionally, more than one software artifact can be evaluated as above so that the user can select one or more of several candidate software artifacts.

The data flows are illustrated herein by way of example to further understanding of the principles discussed here. Actual implementations can omit one or more portions of the data flows, and/or can include other data flows which are within the scope and spirit of the discussion herein.

Figure 2:
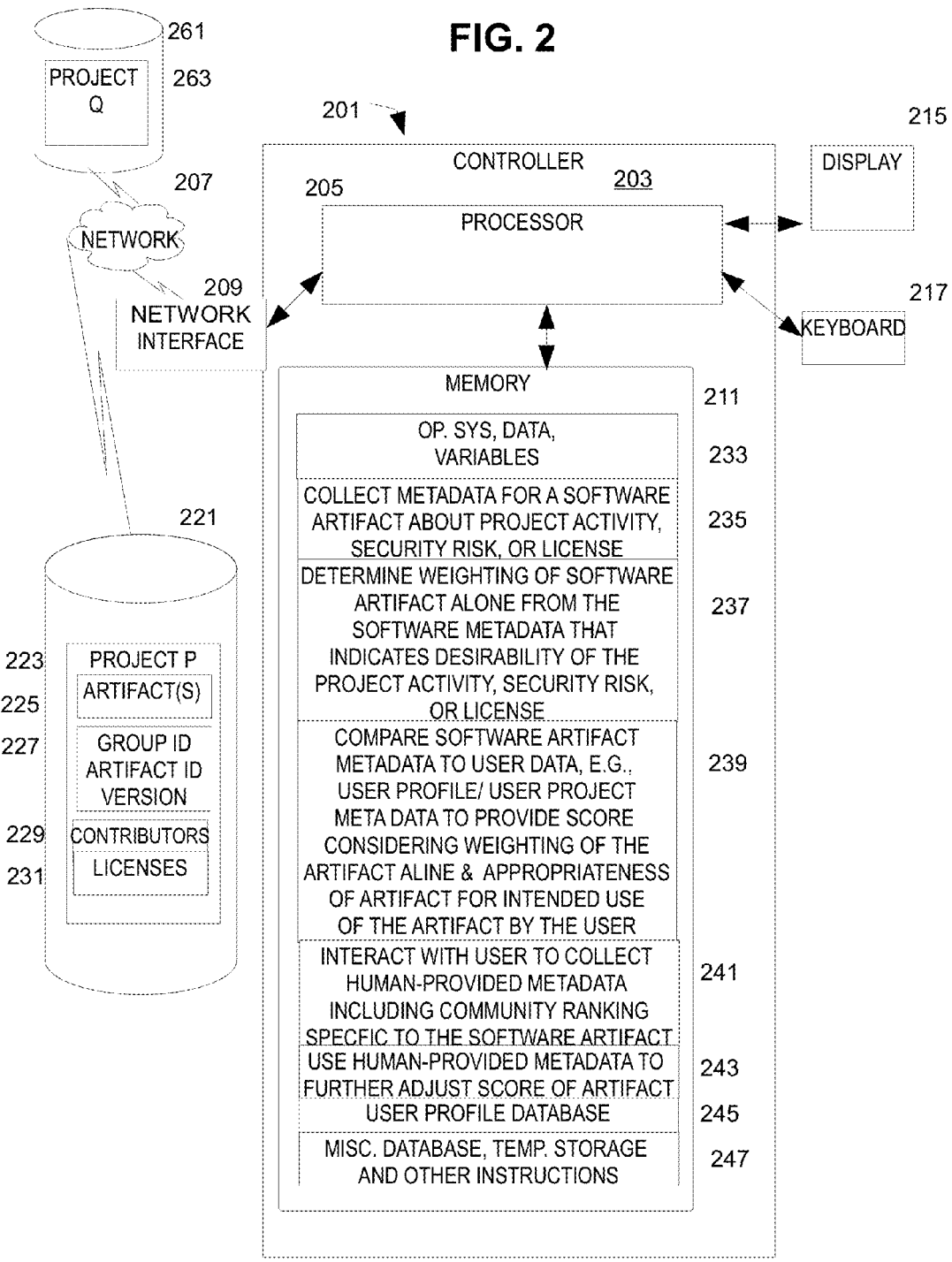
FIG. 2 is a diagram illustrating portions of a computer and a software artifact.

Referring now to FIG. 2, a diagram illustrating portions of a computer and a software artifact will be discussed and described. The computer 201 may include one or more controllers 203, a processor 205, a network interface 209 for communication with a network 207, a memory 211, a display 215 (optional), and/or a user input device such as a keyboard 217. Alternatively, or in addition to the keyboard 217, a user input device may comprise one or more of various known input devices, such as a keypad, a computer mouse, a touchpad, a touch screen, a trackball, and/or a keyboard. The display 215 may present information to the user by way of a conventional liquid crystal display (LCD) or other visual display, and/or by way of a conventional audible device (e.g., a speaker) for playing out audible messages.

The processor 205 may comprise one or more microprocessors and/or one or more digital signal processors. The memory 211 may be coupled to the processor 205 and may comprise a read-only memory (ROM), a random-access memory (RAM), a programmable ROM (PROM), and/or an electrically erasable read-only memory (EEPROM). The memory 211 may include multiple memory locations for storing, among other things, an operating system, data and variables 233 for programs executed by the processor 205; computer programs for causing the processor to operate in connection with various functions such as collecting 236 metadata for a software artifact, determining 237 blind weighting of a software artifact, comparing 239 the software artifact metadata to the user data to score appropriateness of artifact for intended use by the user, interacting 241 with the a user to collect human-provided metadata, using 253 human-provided metadata to adjust the score; a database of user profiles 245; and a database 247 for other information and/or instructions used by the processor 205. The computer programs may be stored, for example, in ROM or PROM and may direct the processor 205 in controlling the operation of the computer 201. Each of these functions is considered in more detail herein.

The user may invoke functions accessible through the user input device such as the keyboard 217. The user input device may comprise one or more of various known input devices, such as a keyboard (217, illustrated) and/or a pointing device, such as a mouse; the keyboard 217 may be supplemented or replaced with a scanner, card reader, or other data input device; and the pointing device may be a mouse, touch pad control device, track ball device, or any other type of pointing device.

The display 215 is representative of a display that may present information to the user by way of a conventional liquid crystal display (LCD) or other visual display, and/or by way of a conventional audible device for playing out audible messages.

Responsive to manual signaling from the user input device represented by the keyboard 217, in accordance with instructions stored in memory 211, and/or automatically upon receipt of certain information via the network interface 209, the processor 205 may direct the execution of the stored programs.

The computer 201 can access a repository 221, 261 on which is stored one or more projects, e.g., Project P 223 and Project Q 263. In the project 223 are one or more artifacts and a Group ID, artifact ID, and version (collectively, "GAV"), here represented by one artifact 225 and its GAV 227. The project 223 also lists its contributors 229 and one or more licenses 231 that cover the artifacts in the project. The project 223 can also include a project log (not illustrated). Although the repositories 221, 261 are illustrated as accessed over a network, they may be configured to be remotely or locally accessible from the computer 201, over a wired or wireless connection. An example of the repository 221 is Maven, available from Sonatype or Apache.

The processor 205 may be programmed for collecting 236 metadata for a software artifact about project activity, security risk, or license information. For example, one or more artifacts 225 can be accessed on the repository; the information about the activity of the project 223 that the artifact is in can be collected from the project log within the artifact's project information at the repository 221, 261; and information about the contributors, licenses, and the like for the project 223 which the artifact 225 is in can be collected from the repository. Techniques are known for accessing this information from a repository 221, 261.

The processor 205 may be programmed for determining 237 blind weighting of a software artifact from the software metadata, which indicates the project or artifact activity, the security risk of the artifact, and/or the licenses 231 for the artifact(s) 225. The activity of the artifact and/or its project can be obtained from the project log (not illustrated) as further discussed herein. There are conventional information sources which discuss software artifacts, which can be crawled and indexed and rendered into a schema used to generate the blind scoring, e.g., machine generated or published information. Also, there is subjective information that people can have about software artifacts, and people who have used software artifacts may be willing to share the subjective information about the software artifacts (so-called "crowd-sourcing"). Also, code quality metrics can be run against a software artifact or run available analysis tools to get information about how good and secure a piece of software is, all in accordance with conventionally available techniques; the metrics do not reflect whether a human likes the software artifact or not. The computer metrics can rate the software artifact a low score of 20/100, whereas a human that really likes the software might boost its score. The ranking of the artifact can be correlated to how active an artifact is, as well as how recent the activity is. The security risk of an artifact can be obtained after being correlated from a publicized evaluation of released software (as previously discussed). An artifact is less desirable if it has a known security risk, and can be even less desirable when the vulnerability is indicated as serious in the third party security information. The licenses 231 which apply to the artifact 225 are indicated in the project 223 to which the artifact belongs; the more restrictive a license, generally the less desirable the license. Also, other factors discussed herein can contribute to the blind weighting, such as reputation of the project's sponsor (obtained by cross referencing the sponsor listed in the project information with sponsor reputations), with a better sponsor reputation resulting in a more desirable artifact; reputation of the artifact's author (obtained by cross referencing the author listed in the project information with author reputation), with a better author reputation resulting in a more desirable artifact; measurements of the artifact 225 (as can be obtained by conventionally available applications such as a scan), with a better measurement resulting in a more desirable artifact; and/or evaluations by humans (such as may be typed in by a human), with a higher evaluation or ranking resulting in a more desirable artifact. It will be appreciated that a ranking of an artifact can be reduced or increased as appropriate based on this information. This results in a blind weighting, that is, a weighting of the artifact that is the same regardless of the user requesting the blind weighting or the user's intended use (and hence, "blind" to the user or intended use of the artifact).

The processor 205 may be programmed for comparing 239 the software artifact metadata to the user data to score appropriateness of artifact 225 for intended use by a user. The user data can be obtained from a user profile which is input by prompting the user for information such as organization to which the user belongs, project to which the user belongs, and/or standards to apply for artifact selection. The intended use of the software artifact can be expressly indicated in the user profile such as artifact selection standards listed therein, and/or can be inferred from the user's project in which the user participates. The user's project can be expressly indicated in the user profile, and/or can be inferred by scanning repositories to find out which project(s) 223, 263 lists the user as a contributor and/or which projects list the user's organization as a sponsor. Express or inferred properties can include, for example, minimum or maximum frequency of downloading and/or updating of an artifact, usual contributors, usual sponsors, reputation of sponsor or author, minimum or maximum versions of an artifact, licenses, source code language, geographic location, organization size, organization industry, organization regulations, public/private organization, and the like. The greater the overlap of properties of the software artifact 225 with the user's intended use, the more appropriate the artifact is with the intended use of the artifact by the user. Likewise, the appropriateness is reduced when the artifact's express or inferred properties have less overlap with the user's intended use. This appropriateness comparison can be used together with the blind weighting to provide an overall score for the intended use of the artifact by the user. For example, a particularly highly blind ranked piece of code with a small license overlap may be very suitable for a user's intended use, despite being from a source with no similarity to the user's sponsor; also, a very low ranked artifact with complete overlap between express and inferred properties and very reputable sponsor and author may be the least desirable because the artifact remains very buggy.

The processor 205 may be programmed for interacting 241 with the user to collect human-provided metadata including community ranking specific to the software artifact 225. A user interface may be provided to elicit textual descriptions of the artifact, to elicit the human's ranking of the artifact (e.g., numeric ranking, or up to five stars, or similar), or the like, as discussed further herein. Known techniques can be used to interact with a user to collect community rankings, although these techniques have not been used in connection with software artifacts 225. The human-provided metadata can be stored together with an indication of the author that provided the data.

The processor 205 may be programmed for using 253 the human-provided metadata to adjust the score of the artifact. For example, the quality of the review can be determined from the known reputation of the author and hence its influence on adjusting the ranking of the article can be appropriately weighted by the author's reputation. Open source systems use known techniques for calculating and storing reputations of authors.

The memory 211 may be programmed with a database of user profiles 245. Here, the user profile database 245 is illustrated as being local to the computer 201. Alternatively, the user profile database can be provided remotely and/or distributed to two or more computers. A user profile in the database can store the information provided by interacting with the user, such as the name or unique identity of the organization to which the user belongs, the unique identity (e.g., GAV) or name of the project to which the user belongs, and/or user-selectable standards to apply for artifact selection. In a variation, the user profile included in the user profile database 245 can point to one or more different user profiles to use in addition to or instead of the user profile. For example, a user profile of a line coder may point to the user profiles of the project lead and/or the organization's COO which can establish different minimum or maximum standards imposed on the line coder's selection of an artifact.

As will be understood in this field, besides the functions discussed above, the memory 211 can include other miscellaneous information in a misc. database 247, along with the usual temporary storage and other instructions for other programs not considered herein.

The computer 201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 205, memory 211, a disk drive and/or removable storage medium are referred to as "computer-readable storage media" and provide non-transitory storage of computer programs and data.

It should be understood that FIG. 2 is described in connection with logical groupings of functions or resources. One or more of these logical groupings may be omitted from one or more embodiments, for example, the functionality of interacting with the user 241 to collect the human-provided metadata can be omitted and/or performed on a different processor. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 3:
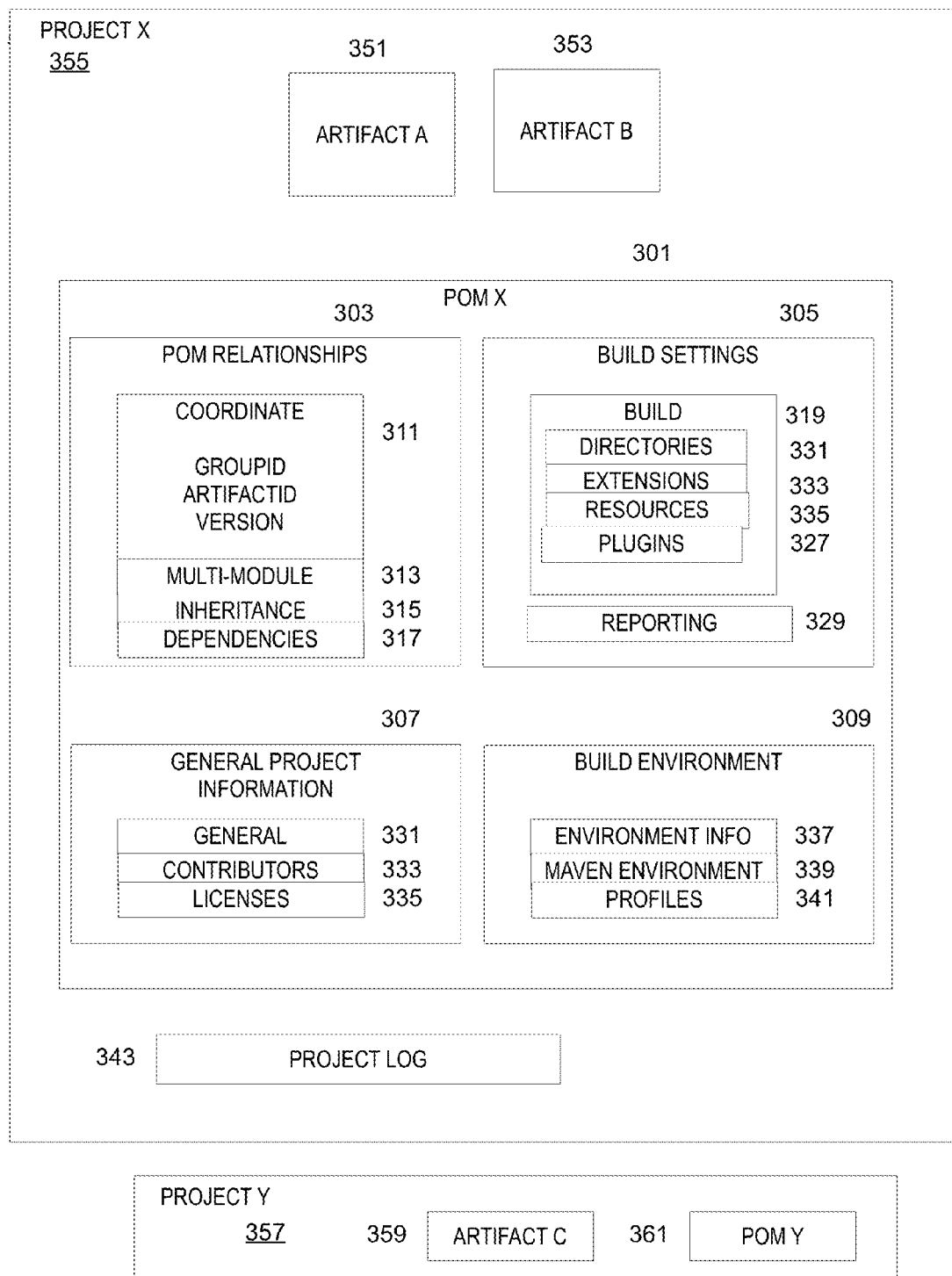
FIG. 3 is a block diagram illustrating a project object model.

Referring now to FIG. 3, a block diagram illustrating a project object model will be discussed and described. The project, e.g., project X 355 includes one or more artifacts (here represented by Artifacts A and B 351, 353), the project log 343 for Project X, and metadata for the project X (here represented by POM X 301) that identifies project information such as contributors 333 and licenses 335. The illustrated example is a known Maven software (currently available at Apache) project object model, which provides a highly structured handling of projects and artifacts; a discussion of relevant portions is provided while other less relevant and known information is omitted. Maven is a build management tool that comprises a project object model ("POM"), a set of standards, a project lifecycle, a dependency management system, and logic for executing plugin goals at defined phases in a lifecycle.

A "Project Object Model" (POM), e.g., POM X 301 is a file provided for a project 355 that describes configures and customizes an application and is associated with one or more artifacts by being included in the same directory as one or more artifacts. In different build tools or project management tools, the POM 301 is a file included in a project, e.g., project X 355, which includes one or more artifacts (represented by artifact A and artifact B 351, 353); the POM can be a file with a pre-determined name: a Maven pom.xml file, a GNU Makefile, or an Ant build.xml file. The POM file is typically targeted to Java applications, building JAR artifacts, C# sources, or the like. A software artifact can be associated with a POM in alternative ways, for example, by including a link or identification of the associated POM.

The POM 301 can contain description data and configuration data: POM relationships 303, build setting 305, general project information 307, and build environment 309. These are discussed in more detail. General project information 307 includes general data 331 (project's name, the URL for a project, the sponsoring organization), a list of developers and contributors 333, and the license (or identifiers of licenses) for the project 355.

The build settings 305 for the project 355 customize the behavior of a build 319 by specifying location of directories 321, extensions 323, resources 325 and plugins 327. Also, the build settings 305 can specify reporting 329 to be used for the POM 301.

The build environment 309 comprises settings and profiles that can be activated when the software comprising the artifacts 351 is built for use in different environments. For example, during development the built software is deployed to a development server, whereas in production developers the built software is deployed to a production server. This example provides build environment information 337, Maven environment information 339, and profiles 341 to be used in different builds. Techniques for executing a build of software are known.

The POM relationships 303 include POM coordinates 311 that specify a group ID, an artifact ID, and a version number for the project 355 and for the POM 301. In the conventional Maven system, group ID, artifact ID and version (GAV) uniquely identify each artifact. The group ID is meant to identify the individual or organization that published the artifact. The artifact ID uniquely identifies an artifact for the Group, and in accordance with known techniques indicates what functionality the artifact is addressed to; artifact IDs need not be unique for different groups. The version is the temporal axis for how an artifact changes in accordance with known techniques, e.g., Version 1.0 is least mature, and Version 8.2.3 is more mature. Collectively, the group ID, artifact ID and version number are sometimes referred to herein as the "GAV", "Maven coordinate" or "GAV coordinate". The GAV uniquely identifies an artifact and allows its dependencies and relationship to other artifacts to be tracked. The use of the GAV disambiguates amongst artifacts across various domains of different groups.

Since each artifact 351, 353 is associated with the metadata, i.e., the information in the POM 301, the user can be provided with very targeted information. For example, a user can be informed that a particular artifact has not been updated for a long time or has security vulnerabilities to be fixed.

The POM as used in Maven is discussed in "MAVEN: The Complete Reference Guide", Edition 8 (2010). In a well-written POM, there is a block for "description," "project", "URL", "License", "Issue tracking", "author list" and the like. Known techniques can be used to construct a POM.

A project, e.g., project X 355 can have a parent, e.g., project Y 357. Project Y 357 is illustrated to include representative artifact C 359 and a POM Y 361. Values which are not specified in the POM in a child project can inherit values from the POM of a parent project, e.g., when general project information 307 is not specified in the POM X 301 of Project X 355, the project X 355 can inherit the general project information specified in the POM Y 361 of the parent project Y 357.

Also included in a project 355 is a project log 343. The project log 343 can perform known functions, such as recording source code check-in, who checked it in, why it was checked-in; recording source code check-out, who checked it out, why it was checked-out; recording update of an artifact, who updated it, from what sponsor, and why it was updated; recording a download of an artifact from the project, who downloaded it, and to where; tracking issues such as bugs and related fixes specifying artifacts which were fixed); and similar. Any and all of the foregoing are considered to be an activity. Typically the log includes a time stamp for each activity. This information may be divided between more than one file, which together can be considered to be a project log. Techniques for maintaining a project log are known in the industry.

A different project, e.g., project Y 357 includes other artifacts (here represented by Artifact C 359), the project log (not illustrated) for Project Y, and metadata for the project Y (here represented by POM Y 361) that identifies project information such as contributors and licenses.

A simple example of a POM follows:

```
<project>
    <!-- model version is 4.0.0 for Maven 2.x POMs -->
    <modelVersion>4.0.0</modelVersion>
    <!-- project coordinates, i.e. a group of values which uniquely
        identify this project -->
    <groupId>com.mycompany.app</groupId>
```

-continued

```
    <artifactId>my-app</artifactId>
    <version>1.0</version>
    <!-- library dependencies -->
    <dependencies>
        <dependency>
            <!-- coordinates of the required library -->
            <groupId>junit</groupId>
            <artifactId>junit</artifactId>
            <version>3.8.1</version>
            <!-- this dependency is only used for running and
                compiling tests -->
            <scope>test</scope>
        </dependency>
    </dependencies>
</project>
```

It is not necessary to use a POM structure according to Maven; alternative implementations of a project which include artifacts and a project log will be appreciated.

The system can include a user interface for obtaining subjective information that people have about software artifacts which they are willing to share (referred to sometimes as "crowd-sourcing" or "artifact evaluations by humans"). The User Interface figures FIG. 4A, FIG. 4B, and FIG. 5 disclose representative information that humans manually can provide about code. As will be appreciated, ratings provided by humans tend to be subjective.

Figure 4A:
FIG. 4A-4B is a diagram illustrating a user interface listing human-provided meta-data for an artifact.
Figure 4B:
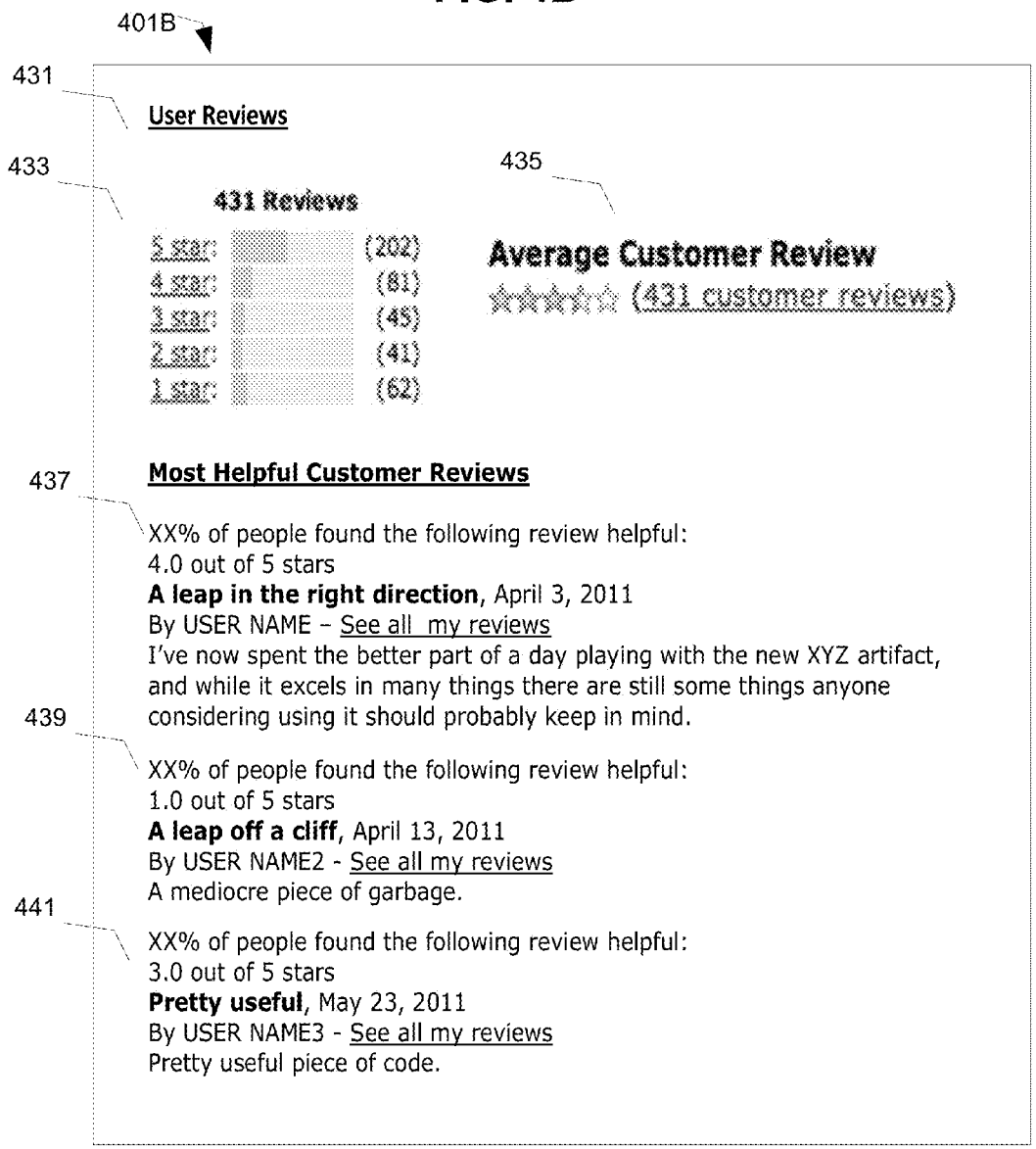

FIG. 4A and FIG. 4B together are a single User Interface to allow a user to see reviews of an artifact, and FIG. 5 is also a simple User Interface to allow a user to create a user review of a software artifact. Each of these is discussed below in more detail.

Referring now to FIG. 4A and FIG. 4B, a diagram illustrating a user interface 401A, 401B listing human-provided meta-data for an artifact will be discussed and described. In FIG. 4A, the user interface 401A interacts with a user to obtain an artifact name 403 (such as text title of artifact name, GAV, and/or the like) and a project name 405 (which can be the identifier or title of the project). The user interface 401A displays an average or media of rankings 407 provided by other humans in their reviews as well as a total number of reviews. The user can select to "see all reviews", in which case another window or a further portion of the user interface 401B listing "all reviews" can be opened. The user interface 401A can display a description 409 of the artifact previously input by the contributor of the artifact, as may be obtained from the artifact content, artifact metadata, or the artifact's project. The user interface 401A can display statistics 411, such as metrics previously obtained about the artifact. The user interface 401A can display other artifacts 413 typically downloaded by users after viewing this artifact, which information is obtained in accordance with known techniques. Also, the user interface 401A can display tags that users associate with this artifact, in this example, previously input or selected by users e.g., security, log-in, Foo, Crypto, Authentication, Foo and Fee. Further, the user interface 401A can allow the user to also select which of the previously input or selected tags are relevant to the artifact, and includes a "your tags" input field 417 for the user to enter their own tag. In this way, an artifact can be associated with textual tags that can be stored as part of the human-provided meta-data about an artifact and can later be used for searching for artifacts.

Referring now to a further portion of the user interface, the user interface 401B can include a summary of user review 431, such as a bar chart 433 listing user review statistics (with number of 5-star, 4-star, etc. rankings), and average customer review rating 435. The user interface 401B can list customer reviews 437, 439, 441 that were voted on as being most helpful, in order. The user interface can also provide a means for voting (not illustrated) on the helpfulness of the customer reviews, in accordance with known techniques.

Referring now to FIG. 5, a diagram illustrating a user interface to collect human-provided meta-data for an artifact will be discussed and described. In this instance, the user is willing to share their subjective opinion regarding an artifact. The user interface 501 interacts with a user to obtain the unique name of an artifact. The user interface 501 provides a field and prompts the user to input a rate for the artifact, in this example, one to five stars; other rankings or ratings or grades can be provided according to known techniques. The user interface 501 provides a title field 505 for the user to enter a title of the user's review. The user interface 501 can provide a shared opinion field 507 for the user to enter the user's review/opinion of the artifact. The user interface 501 can allow the user to input a textual tag 509; alternatively or in addition thereto, the user can be prompted also select which previously input tags are relevant to the artifact. When the user has completed their review, a "submit" button 511 can be selected, causing the user's review to be stored as human-provided meta-data for the artifact.

The user referred to in connection with FIG. 4A, FIG. 4B, and FIG. 5 can be known to the repository such that the user can have a reputation (as discussed above, using techniques employed by repositories). Accordingly, the user's reviews provided in these user interfaces can be weighted according to the user's reputation (or alternatively the user's project's reputation or user's sponsor's reputation) such that a review by a highly reputable user can be given more weight than a review by a non-reputable user.

Figure 6:
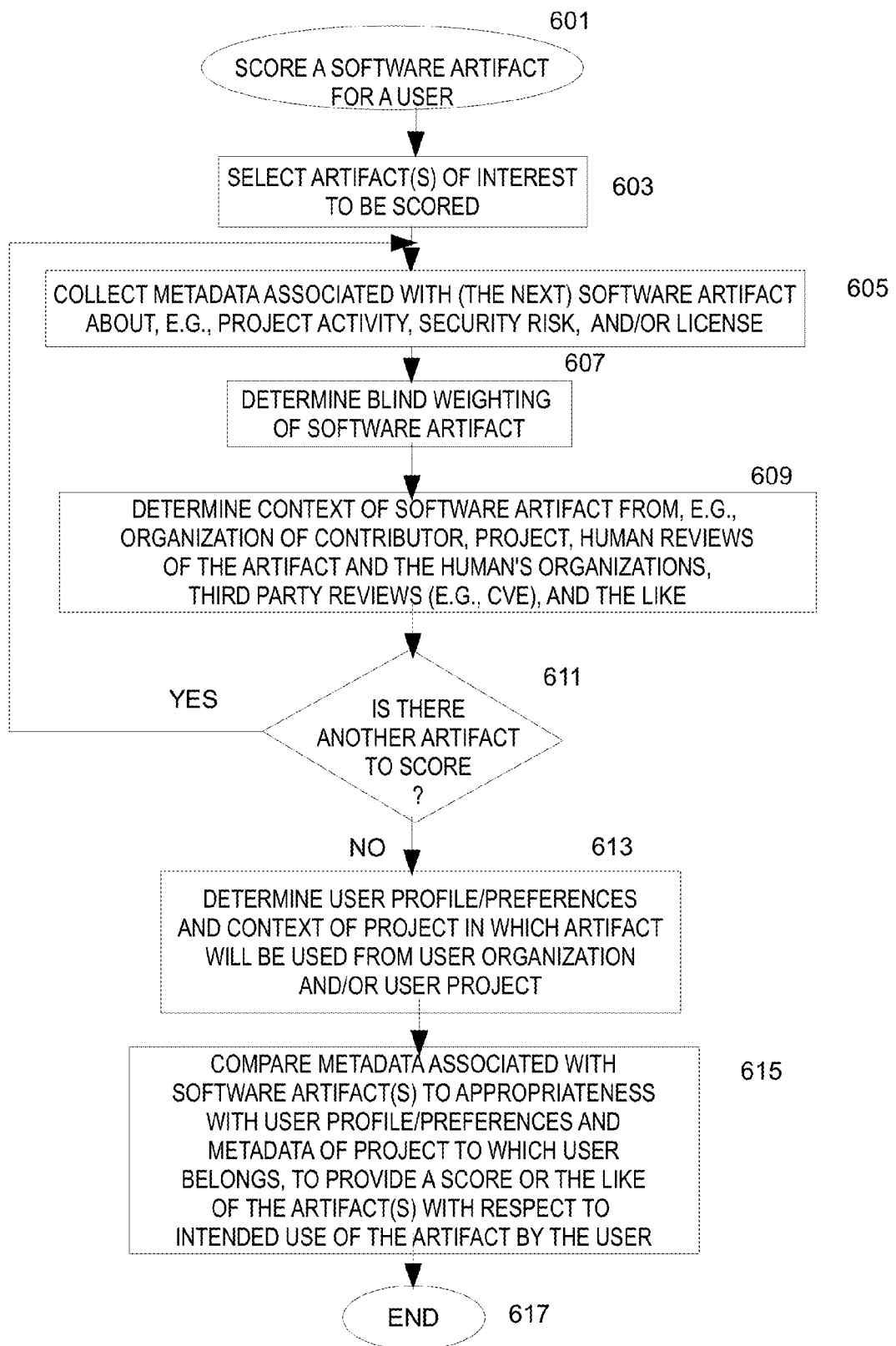
FIG. 6 is a flow chart illustrating a procedure to score a software artifact for a user.

Referring now to FIG. 6, a flow chart illustrating a procedure to score a software artifact for a user will be discussed and described. The procedure can advantageously be implemented on, for example, a processor of a controller, described in connection with FIG. 2 or other apparatus appropriately arranged.

In overview, the procedure 601 to score a software artifact for a user and the user's intended use includes selecting 603 artifact(s) of interest to be scored, then for each of the selected artifacts collecting 605 the artifact's metadata, determining 607 the blind weighting of the software artifact, and determining 609 the context of the artifact; when the blind weighting and context of all of the selected artifacts is determined, then the procedure 601 determines 613 the user profile/preferences and the context of the intended use of the project, and compares 615 the context of the artifact metadata with appropriateness with the user profile/preferences and context of the intended use of the artifact, and adjusts the blind weighting with the appropriateness score to provide a score of the software artifact(s) with respect to the intended use by the user. Then the procedure 601 ends 617. These are discussed further below. However, much of the detail associated with the procedure is described above, and accordingly will not be repeated.

The procedure includes selecting 603 artifact(s) of interest to be scored. Different procedures can be used to select artifacts to be scored. For example, the user may have searched one or more repositories for relevant artifacts, or the user may have indicated an entire project in a repository, or the user may have entered the GAV(s) of one or more artifact(s), or the user may be at the repository and have clicked on the artifact. However the artifacts have been selected, the point is that there is one or more artifacts which are to be scored.

The procedure includes, for each of the selected artifacts collecting 605 the artifact's metadata, for example by referring to the project which contains the artifact and obtaining the metadata (such as a POM or similar) for the project.

The procedure includes, for each of the selected artifacts, determining 607 the blind weighting of the software artifact. Blind weighting has been described herein elsewhere in more detail.

The procedure includes, for each of the selected artifacts, determining 609 the context of the artifact, for example, from the organization of the contributor, from the project's organization, from the human reviews of the artifact and the respective human's organizations, from third party reviews (such as security rankings), and the like. Determining the context of the artifact has been described herein in more detail and will not be repeated here.

The procedure can loop for each of the artifacts 611 to collect 605 artifact metadata, determine 607 artifact blind weighting, and determine 609 context of the artifact.

Then the procedure 601 can determine 613 the user profile/preferences and the context of the intended use of the artifact, for example the project in which the artifact will be used, as based on the user's organization and/or the user's project. This also has been described elsewhere in detail.

For each of the artifacts, then the procedure compares 615 the context of the artifact metadata with appropriateness with the user profile/preferences to the context of the intended use of the artifact, all as explained elsewhere in much more detail. Further, for each of the selected artifacts, the procedure adjusts the blind weighting with the appropriateness score to provide a score of the software artifact(s) with respect to the intended use by the user. Then the procedure 601 ends 617.

The discussion herein refers to "metadata". Metadata can be collected from various, disparate sources, whether from the artifacts stored in the repository itself (e.g., last modified timestamp on the artifact file), the project log for the project which includes the artifact, from publicly available third-party sources (e.g. cve.mitre.org, who publishes vulnerability information), or from the outputs of metric processes that can be run on the artifacts that are housed in the repository (e.g. a file scanner looks for binary incompatibilities between an artifact's current version and the version(s) prior).

Software projects, more particularly open source software projects, conventionally collect information about project "activity," and/or artifact "activity," which reflects whether an artifact is kept up to date (i.e., recently updated), whether it is being actively developed (i.e., lots of recent activity). This is particularly true where the software source code is open source, which controls use of artifacts so that the project log must reflect the activity.

Security risk of a software artifact is referred to herein, and generally encompasses software vulnerabilities and security. The Mitre CVE (Common Vulnerabilities and Exposures) list and NIST NVD (National Vulnerability Database) and other organizations conventionally provide text information about vulnerabilities and security of commercial software applications. However, the CVE list and NVD database indicate commercial software application names and versions or version ranges which do not readily map to software artifact coordinates. Furthermore, the CVE and NVD rating of vulnerabilities is based on the seriousness of the vulnerability.

Licenses are referred to herein. Well known in the open source field is that a license can be associated with an artifact. The method or system can collect the identity of the license or the content of the license, which is listed for example in the project such as in the POM associated with the artifact. The license further can be normalized to indicate permitted and prohibited activities. (There are a several pre-determined open-source licenses in common use as well as variations thereof, as well as some customized licenses.) The license (which permits or prohibits certain activities) can be scored against what the user intends to do with the software, as further discussed herein.

The open source world tends to make available high-level descriptions down to low-level walk through guides. This documentation can be conventionally published in association with the open source code software artifacts. Keywords can be extracted from the documentation and can be useful for searching and categorization and the like since they tend to describe how code is used, and what it can be used with.

In review, one can say that there are five buckets of information which can be used for scoring an artifact: (1) activity of the project to which the artifact belongs, (2) security and vulnerability information which can be mapped to an artifact, (3) licensing information for the license(s) of the artifact, (4) categorization information of the artifact, and (5) ratings provided by users (subjective human side) for the artifact.

Scoring can take into account the machine-generated/collected metrics, and can overlay the human-collected metrics. Once the human-provided and/or non-human-provided metrics are synthesized, it can be translated to a scale for a particular user. Different users will have different results for scoring the same software artifact.

An artifact further can be scored differently depending on how the user is defined in its profile. A user's profile is obtained from a user's logon, user name or similar. A user's profile can indicate that the user is associated with a particular project, has a pre-defined role, and which profile is used for scoring (e.g., my profile or the project lead's profile).

Knowing what industry the user is in, what role in the company the user plays, and what type of application(s) the user is developing can contribute to the overall score given to an artifact. This information can be used to make context-specific recommendations on the appropriateness of the artifact for that specific user that should give better results than simply taking into account user rankings or comments across all user classes or organization types.

The user's profile can be created to indicate, for example industry (such as bank, manufacturing industry, or the like), size of company (Fortune 100, Fortune 100, small, etc.). The user's profile can indicate the project to which the user belongs, such as a particular open source project (techniques for setting up projects are well known in the open source field).

To score the article, the artifact can be weighted:
A mature, active project can be ranked higher (e.g., activity is determined using project activity of the project to which the artifact belongs, since open source repositories conventionally track project activity).
It is determined whether the artifact is safe, i.e., does it have any outstanding vulnerabilities. For example, if the NIST NVD is normalized (as discussed herein) to suggest that the artifact may have a vulnerability, then the ranking can be reduced.
And so forth, as discussed above.
Then, appropriateness with the user's intended use is compared:
It is determined whether the license appropriate with the user's intended use. For example, if the license associated with the artifact limits use in manufacturing, and if the user's profile or user's organization information or user's project information indicates that it is in the manufacturing industry, then the license is not appropriate with the intended use of the artifact, resulting in a reduced ranking.

The user's profile is used to relatively weight the artifact, for example, by using people who are similar to the user's profile ("used by users like me"), and/or using user's preferences indicated in the user's profile, and/or as explained above.

Then, a score for the artifact with respect to the user's intended use can be provided. There are many known techniques for placing a relative value on something, such as ranking, e.g., 1-10; scoring, e.g., 90%; grading, e.g. A-F; rating, e.g., 3 out of 5; appraising; classifying, e.g., acceptable, unacceptable, good-better-best; weighting one of the foregoing; and variations thereof. The terms ranking, rating, and scoring, and the like, are at times used interchangeably herein.

The detailed descriptions which appear above may be presented in terms of program procedures executed on a computer or network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the present invention contemplates the use of an operator to access the invention, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will appear from the description given herein.

Furthermore, the communication networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), NetBIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer-implemented method for scoring a software artifact for a user, comprising:
   collecting, from a software repository by communication over the transceiver, metadata associated with a software artifact about project activity of how active an artifact project is to which the software artifact belongs, a security risk indicated in the metadata of the software artifact, or a license indicated in the metadata of the software artifact;
   determining a weighting, without regard to an intended use of the software artifact by a user, of the software artifact alone from the metadata associated with the software artifact that indicates desirability of the project activity, the security risk, or the license;
   comparing the metadata associated with the software artifact to appropriateness with a metadata of a user project to which the user belongs as indicated by a profile of the user, so as to provide a score considering the determined weighting of the software artifact and an appropriateness of the software artifact for the user with respect to the intended use of the software artifact by the user; and
   interacting with user to collect human-provided metadata including community ranking specific to the software artifact, storing the human-provided metadata in relation to the software artifact, and using the human-provided metadata to further adjust the score of the software artifact.

2. The method of claim 1, wherein the metadata assigned to the software artifact and which is used in determining the weighting of the software artifact includes Group ID, Artifact ID, and version number from a project object model (POM) assigned to the software artifact in the repository,
   the artifact project being determined from the Group ID, Artifact ID, and version number,
   how active the artifact project is being determined from a log of the project at the software repository of the project of the software artifact.

3. The method of claim 1, wherein the metadata of the user project to which the user belongs used in determining the appropriateness of the software artifact includes:
   an indication of functionality the software artifact is addressed to,
   an indication of the sponsoring organization of the user project,
   an indication of the license of the user project.

4. The method of claim 1, further comprising weighting the software artifact by a user-provided ranking, specific to the software artifact, of a community of users to which the user belongs as determined by the profile of the user or the user project to which the user belongs as indicated by the profile of the user.

5. The method of claim 1, wherein the software artifact is in stored in the software repository according to the Open Source Definition, the software repository being an open source repository.

6. A computer system, comprising:
   a transceiver operable to transmit and receive communications over at least a portion of a network; and
   a processor cooperatively operable with the transceiver, and configured to facilitate:
      collecting, from a software repository by communication over the transceiver, metadata associated with a software artifact about project activity of how active an artifact project is to which the software artifact belongs, a security risk indicated in the metadata of the software artifact, or a license indicated in the metadata of the software artifact;
      determining a weighting, without regard to an intended use of the software artifact by a user, of the software artifact alone from the metadata associated with the software artifact that indicates desirability of the project activity, the security risk, or the license;
      comparing the metadata associated with the software artifact to appropriateness with a metadata of a user project to which the user belongs as indicated by a profile of the user, so as to provide a score considering the determined weighting of the software artifact and an appropriateness of the software artifact for the user with respect to the intended use of the software artifact by the user; and
      interacting with the user to collect human-provided metadata including a community ranking specific to the software artifact, storing the human-provided metadata in relation to the software artifact, and using the human-provided metadata to further adjust the score of the software artifact.

7. The computer system of claim 6, wherein the metadata assigned to the software artifact and which is used in determining the weighting of the software artifact includes Group ID, Artifact ID, and version number from a project object model (POM) assigned to the software artifact in the repository,
   the artifact project being determined from the Group ID, Artifact ID, and version number,
   how active the artifact project is being determined from a log of the project at the software repository of the project of the software artifact.

8. The computer system of claim 1, wherein the metadata of the user project to which the user belongs used in determining the appropriateness of the software artifact includes:
- an indication of functionality the software artifact is addressed to,
- an indication of the sponsoring organization of the user project,
- an indication of the license of the user project.

9. The computer system of claim 6, further comprising weighting the software artifact by a user-provided ranking, specific to the software artifact, of a community of users to which the user belongs as determined by the profile of the user or the user project to which the user belongs as indicated by the profile of the user.

10. The computer system of claim 1, wherein the software artifact is in stored in the software repository according to the Open Source Definition, the software repository being an open source repository.

11. A non-transitory computer-readable medium comprising instructions for execution by a computer, the instructions including a computer-implemented method for providing a method for scoring a software artifact for a user, the instructions for implementing:
- collecting, from a software repository by communication over a transceiver, metadata associated with a software artifact about project activity of how active an artifact project is to which the software artifact belongs, a security risk indicated in the metadata of the software artifact, or a license indicated in the metadata of the software artifact;
- determining a weighting, without regard to an intended use of the software artifact by a user, of the software artifact alone from the metadata associated with the software artifact that indicates desirability of the project activity, the security risk, or the license;
- comparing the metadata associated with the software artifact to appropriateness with a metadata of a user project to which the user belongs as indicated by a profile of the user, so as to provide a score considering the determined weighting of the software artifact and an appropriateness of the software artifact for the user with respect to the intended use of the software artifact by the user; and
- interacting with the user to collect human-provided metadata including community ranking specific to the software artifact, storing the human-provided metadata in relation to the software artifact, and using the human-provided metadata to further adjust the score of the software artifact.

12. The non-transitory computer-readable medium of claim 11, wherein the metadata assigned to the software artifact and which is used in determining the weighting of the software artifact includes a Group ID, Artifact ID, and version number from a project object model (POM) assigned to the software artifact in the repository,
- the artifact project being determined from the Group ID, Artifact ID, and version number,
- how active the artifact project is being determined from a log of the project at the software repository of the project of the software artifact.

13. The non-transitory computer-readable medium of claim 11, wherein the metadata of the user project to which the user belongs used in determining the appropriateness of the software artifact includes:
- an indication of functionality the software artifact is addressed to,
- an indication of the sponsoring organization of the user project,
- an indication of the license of the user project.

14. The non-transitory computer-readable medium of claim 11, further comprising weighting the software artifact by a user-provided ranking, specific to the software artifact, of a community of users to which the user belongs as determined by the profile of the user or the user project to which the user belongs as indicated by the profile of the user.

15. The non-transitory computer-readable medium of claim 11, wherein the software artifact is in stored in the software repository according to the Open Source Definition, the software repository being an open source repository.

\* \* \* \* \*